US008719024B1

(12) United States Patent
Moreno et al.

(10) Patent No.: US 8,719,024 B1
(45) Date of Patent: *May 6, 2014

(54) ALIGNING A TRANSCRIPT TO AUDIO DATA

(75) Inventors: Pedro J. Moreno, Jersey City, NJ (US); Christopher Alberti, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/412,320

(22) Filed: Mar. 5, 2012

Related U.S. Application Data

(63) Continuation of application No. 12/238,257, filed on Sep. 25, 2008, now Pat. No. 8,131,545.

(51) Int. Cl.
*G10L 15/18* (2013.01)

(52) U.S. Cl.
USPC .............................................. 704/257; 704/9

(58) Field of Classification Search
USPC ...................... 704/235, 260, 270, 9, 255–257
See application file for complete search history.

(56) References Cited

U.S. PATENT DOCUMENTS

| | | | | |
|---|---|---|---|---|
| 4,903,305 A * | 2/1990 | Gillick et al. | ............. | 704/245 |
| 6,076,059 A | 6/2000 | Glickman et al. | | |
| 6,236,308 B1* | 5/2001 | Dalum | ............. | 340/436 |
| 6,442,518 B1 | 8/2002 | Van Thong et al. | | |
| 6,912,498 B2* | 6/2005 | Stevens et al. | ............. | 704/235 |
| 7,373,598 B2* | 5/2008 | Vora | ............. | 715/234 |
| 8,131,545 B1* | 3/2012 | Moreno et al. | ............. | 704/235 |
| 2003/0187643 A1 | 10/2003 | Van Thong et al. | | |
| 2004/0041327 A1* | 3/2004 | Jensen | ............. | 271/90 |
| 2004/0199385 A1* | 10/2004 | Deligne et al. | ............. | 704/235 |
| 2005/0149326 A1* | 7/2005 | Hogengout et al. | ............. | 704/242 |
| 2005/0203751 A1* | 9/2005 | Stevens et al. | ............. | 704/276 |
| 2009/0048832 A1* | 2/2009 | Terao | ............. | 704/235 |

OTHER PUBLICATIONS

Lamel, et al. "Lightly Supervised and Unsupervised Acoustic Model Training" *Computer Speech and Language*, vol. 16 pp. 115-129, 2002.
Moreno, et al. "A Recursive Algorithm for the Forced Alignment of Very Long Audio Segments" *Proceedings ICSLP*, 1998.
Hazen, Timothy J. "Automatic Alignment and Error Correction of Human Generated Transcripts for Long Speech Recordings" *Proceedings INTERSPEECH* 2006.

(Continued)

*Primary Examiner* — Abul Azad
(74) *Attorney, Agent, or Firm* — Fish & Richardson P.C.

(57) ABSTRACT

The subject matter of this specification can be implemented in, among other things, a computer-implemented method including receiving audio data and a transcript of the audio data. The method further includes generating a language model including a factor automaton that includes automaton states and arcs, each of the automaton arcs corresponding to a language element from the transcript. The method further includes receiving language elements recognized from the received audio data and times at which each of the recognized language elements occur in the audio data. The method further includes comparing the recognized language elements to one or more of the language elements from the factor automaton to identify times at which the one or more of the language elements from the transcript occur in the audio data. The method further includes aligning a portion of the transcript with a portion of the audio data using the identified times.

24 Claims, 6 Drawing Sheets

(56) References Cited

OTHER PUBLICATIONS

Allauzen, et al. "General in-dexation of weighted automata: Application to spoken utterance retrieval," in *Proceedings of the workshop on interdisciplinary approaches to speech indexing and retrieval HLT/NAACL*, 2004.

Weinstein, et al. "Music identification with weighted finite-state transducers," in *International Conference on Acoustics, Speech, and Signal Processing (ICASSP)*, 2007.

Mohri, et al. "Factor automata of automata and applications," in *Proceeding of the International Conference on Implementation and Application of automata (CIAA)*, 2007.

Zhu, et al. "Combining speaker identification and bic for speaker diarization," in *Proceedings INTERSPEECH*, 2005.

Allauzen, et al. "OpenFst: A general and efficient weighted finite-state transducer library," in *CIAA*, 2007.

* cited by examiner

| Initial State | Destination State | Label |
|---|---|---|
| 0 | | |
| 1 | | |
| 2 | | |
| 3 | | |
| 4 | | |
| 0 | 1 | let's |
| 1 | 2 | go |
| 2 | 3 | to |
| 3 | 4 | dinner |
| 0 | 1 | epsilon |
| 0 | 2 | epsilon |
| 0 | 3 | epsilon |
| 0 | 4 | epsilon |
| 0 | 0 | |
| 1 | 1 | |
| 2 | 2 | |
| 3 | 3 | |
| 4 | 4 | |

ALIGNING A TRANSCRIPT TO AUDIO DATA

CROSS-REFERENCE TO RELATED APPLICATION

This application is a continuation of U.S. application Ser. No. 12/238,257, filed on Sep. 25, 2008, entitled "Aligning a Transcript to Audio Data," the entire contents of which are hereby incorporated by reference.

TECHNICAL FIELD

This instant specification relates to aligning portions of audio data to a transcript of the audio data.

BACKGROUND

During the last years large amounts of audio and their associated transcripts have become available. The prevalence of digital archives of radio and television, lectures, speeches, etc. have become a useful source of information to speech researchers.

Aligning speech to a transcript of the speech is a task that can occur in speech recognition systems. Given properly trained acoustic models, a dictionary for mapping words to phonemes, and a word transcript, an algorithm such as the Viterbi algorithm can be used to align speech to a transcript. However, long audio can be difficult to decode using algorithms such as the Viterbi algorithm. Additionally, transcripts having high error rates can mislead decoding algorithms.

SUMMARY

In general, this document describes using a factor automaton to align a transcript to corresponding audio data. For example, a factor automaton can be used to represent all substrings from a string. In some implementations, the automaton is used to encode a constrained language model that is trained on transcripts of audio. The language model can then be used to align audio with its transcript.

In a first general aspect, a computer-implemented method includes receiving audio data and a transcript of the audio data. The method further includes generating, from the transcript, a language model includes a factor automaton that includes automaton states and arcs, each of the automaton arcs corresponding to a language element from the transcript. The method further includes receiving, from a speech recognizer, language elements recognized from the received audio data and times at which each of the recognized language elements occur in the audio data. The method further includes comparing the recognized language elements to one or more of the language elements from the factor automaton to identify times at which the one or more of the language elements from the transcript occur in the audio data. The method further includes aligning a portion of the transcript with a portion of the audio data using the identified times. The method further includes outputting the aligned portion of the transcript.

Implementations can include any, all, or none of the following features. The language elements from the transcript and the recognized language elements can include words, syllables, phonemes, or phones. Transitions between the automaton states in the factor automaton can occur upon an addition of another language element to the one or more language elements from the factor automaton compared to the recognized language elements. Comparing the recognized language elements to the one or more of language elements from the factor automaton can further include searching the factor automaton. The searching can include ending the comparison or continuing to a next automaton state adjacent to a previous automaton state connected by an arc representing the last language element from the transcript that was successfully matched to a recognized language element.

Transitions from the automaton states in the factor automaton can include a self loop that permits a state to transition to itself instead of transitioning to a different state. The self loop can permit one or more of the recognized language elements having no corresponding language element in the one or more language elements from the factor automaton to be accounted for in the alignment of the transcript. The self loop can permit a portion of the audio having no recognized language elements to be accounted for in the alignment of the transcript.

The factor automaton can allow the one or more language elements from the factor automaton to begin at an automaton state located anywhere in the factor automaton. Generating the language model of the transcript can include generating a list of transitions, each of the transitions can include an identifier of a source automaton state, an identifier of a destination automaton state, and a corresponding language element from the transcript.

The method can include estimating times at which the one or more language elements from the factor automaton likely occur in the audio data, and weighting the comparison of the recognized language elements and the one or more language elements from the factor automaton based on a difference between the estimated times and the times associated with the recognized language elements from the audio data. The method can include determining a level of confidence for the alignment of a portion of the one or more language elements from the factor automaton with the recognized language elements from the audio.

The method can include selecting audio data and transcript portions associated with the level of confidence when the level does not meet a threshold level of confidence. The method can include iteratively performing operations on the selected audio data and transcript portions until the threshold level can be met for the selected audio data and transcript portions or until a stop condition occurs.

The stop condition can include a number of iterations, an indication that the confidence level can be within a satisfactory range from the threshold level, an elapsed period of time, or an amount of processing power used. Steps of the transcript alignment process can be distributed across multiple systems. The method can include outputting the received audio with the output aligned portion of the transcript. The method can include storing the output audio and the aligned portion of the transcript in a training corpus configured for use in training speech recognition systems. The received audio data can be based on television broadcasts, online videos, audio books, or music. The received transcript can be based on closed captions, lyrics, or books.

In a second general aspect, a computer-implemented method includes receiving audio data and a transcript of the audio data. The method further includes generating a factor automaton includes states and arcs that represent language elements in the transcript. The states are linked in a configuration to permit the representation of substantially all possible phrases that occur within the received transcript. The method further includes generating a speech hypothesis of one or more language elements included in the audio using a speech recognizer. The speech hypothesis includes time stamps associated with an occurrence of each of the one or more language elements. The method further includes comparing the one or more language elements of the speech hypothesis with one or more arcs in the factor automaton. The method further includes associating at least a portion of the language elements of the transcript with the time stamps based on the comparison.

In a third general aspect, a computer-implemented system includes an interface that receives audio data and a transcript of the audio data. The system further includes a model builder module that generates from the transcript a language model including a factor automaton that includes automaton states and arcs, each of the automaton arcs corresponding to a language element from the transcript. The system further includes a storage device that stores the factor automaton. The system further includes a speech recognizer that recognizes language elements from the received audio data and determines times at which each of the recognized language elements occur in the audio data. The system further includes means for comparing the recognized language elements to one or more of the language elements from the stored factor automaton to identify times at which the one or more of the language elements from the transcript occur in the audio data and aligning a portion of the transcript with a portion of the audio data using the identified times, and outputting the aligned portion of the transcript.

The systems and techniques described here may provide one or more of the following advantages. First, a system can align a long transcript to corresponding audio data. Second, a system can align a transcript to corresponding audio data where the transcript and/or the audio data have errors, noise, or other discrepancies between one another. Third, a system can align a transcript to corresponding audio data using a small amount of computer memory resources (e.g., as compared to alignment using n-grams). Fourth, a system can align a transcript to corresponding audio data using a small amount of computer processing cycles (e.g., as compared to alignment using n-grams). Fifth, a system can provide for accurate and fast alignment of a transcript to corresponding audio data by use of a restrictive grammar that offers two options when decoding—either end the recognition (e.g., if the end of a sentence or matched substring is reached) or continue with the next language element in the transcript. Sixth, improved accuracy further may be provided through a recursive implementation of the alignment on segments of audio/transcript that appear misaligned during a previous alignment attempt.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for aligning a transcript to corresponding audio data using a factor automaton. A factor automaton is used to represent a language model of the text in a transcript of audio data. A factor automaton is a special type of automaton that represents the set of all factors (or substrings) of a text, such as the transcript of audio data described herein.

The factor automaton can be used as an efficient indexing structure for determining the various possible substrings within the transcript. Factor automata are compact and fast for substring searching and also have small memory requirements. Substrings from the factor automaton are matched to recognized utterances from the audio data. The times associated with the recognized utterances (e.g., relative to the beginning of the audio) are then used to align the matched substrings of the transcript with the audio data.

In some implementations, alignment of a transcript to audio can be used to align closed captions to audio from, for example, TV recordings, movies, or online videos. These aligned transcripts can, in turn, provide a large audio corpus for training a speech recognizer so that the recognizer improves its accuracy in text recognition. In other implementations, the systems and methods described here may permit the alignment of audio books to their transcriptions.

Figure 1:
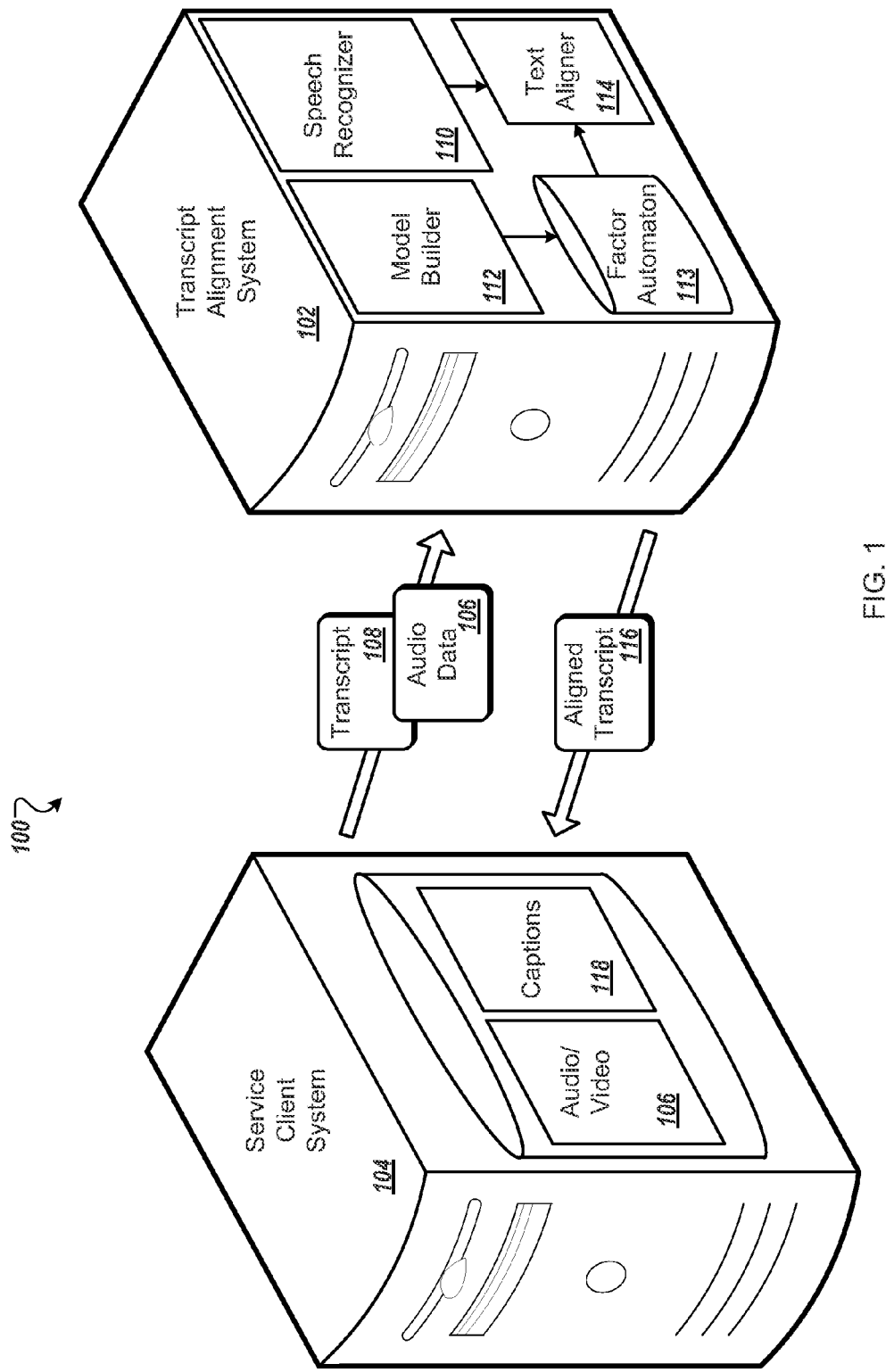
FIG. 1 is a schematic diagram showing an example of a system for aligning a transcript to audio data.

FIG. 1 is a schematic diagram showing an example of a system 100 for aligning a transcript to audio data. The system 100 includes a transcript alignment system 102 and a service client system 104. The transcript alignment system 102 receives an utterance and text of the utterance, such as audio data 106 and a transcript 108 of the audio data 106.

The transcript alignment system 102 includes a speech recognizer 110, a model builder 112, a factor automaton data structure 113, and a text aligner 114. The speech recognizer 110 receives the audio data 106 and recognizes words or other language elements (e.g., phones, phonemes, or syllables) within the audio data 106. The speech recognizer 110 associates each recognized word with a time period at which the recognized word occurred within the audio data 106. For example, the speech recognizer 110 can output recognized words and a start time and stop time for each of the recognized words. Alternatively, the speech recognizer 110 can use another method to identify the location of each recognized word within the audio data 106, such as the distance or location in a memory or other data store of each recognized word.

The model builder 112 receives the transcript 108. The model builder 112 generates a language model that represents the transcript 108. The particular language model generated by the model builder 112 can be based on a factor automaton. The factor automaton allows the transcript alignment system 102 to model any substring within the transcript 108. The generated factor automaton can be stored in the factor automaton data structure 113.

In some implementations, the factor automaton includes a starting state with an arc corresponding to a first word (or other language element unit, such as a phone, phoneme, or syllable) in the transcript 108 (or a first word in a selected portion of the transcript). The factor automaton may also include states with arcs for each of the other words in the transcript 108 (or in the selected portion). Each automaton state may be connected by an arc or transition to a next word in the sequence of words from the transcript 108. One implementation of a factor automaton structure is described in more detail in association with FIG. 3A.

In some implementations, the text aligner 114 compares the recognized words from the audio data 106 to substrings of words from the factor automaton in order to align the audio data 106 with the transcript from which the factor automaton is based. When a match is found, the text aligner 114 associates the times of the recognized words with the corresponding transcript text from the factor automaton. In some implementations, while aligning the recognized words from the audio with the transcript using the factor automaton, the matching of the recognized words can stop at any automaton state. For example, the section of recognized audio being matched may represent a single sentence. At the end of the sentence, the text aligner 114 stops the recognition at the last automaton state that has transcription text that matches the last recognized word in the audio. In some implementations, the text aligner 114 compares a unit of language other than a word, such as phones, phonemes, or syllables from the recognized text and from the substrings in the factor automaton. However, for simplicity of explanation, the following examples describe implementations where the unit of language is a word.

As an alternative to stopping the alignment at an automaton state, the text aligner 114 can continue to match, or identify, a recognized word with a next transcript word represented by the next automaton state in the automaton factor. This process is described in more detail in association with FIG. 3A.

The text aligner 114 may align the transcript 108 with the audio data 106 by combining time indicators derived from the speech recognizer 110 with the transcript 108 to form an aligned transcript 116. The time indicators may then specify when text in the transcript occurs relative to the corresponding utterance in the audio data. The text aligner 114 can output the aligned transcript 116, for example, back to the service client system 104. The service client system 104 may store the aligned transcript 116 as captions 118 along with the audio data 106. The captions 118 and the audio data 106 stored at the service client system 104 can later be accessed by speech recognition systems for training language models, etc. Alternatively, the service client system 104 may provide a requesting client with the captions 118 and the audio data 106 (or video data with audio) having aligned closed captioning for videos, aligned text for audio books, etc.

Figure 2:
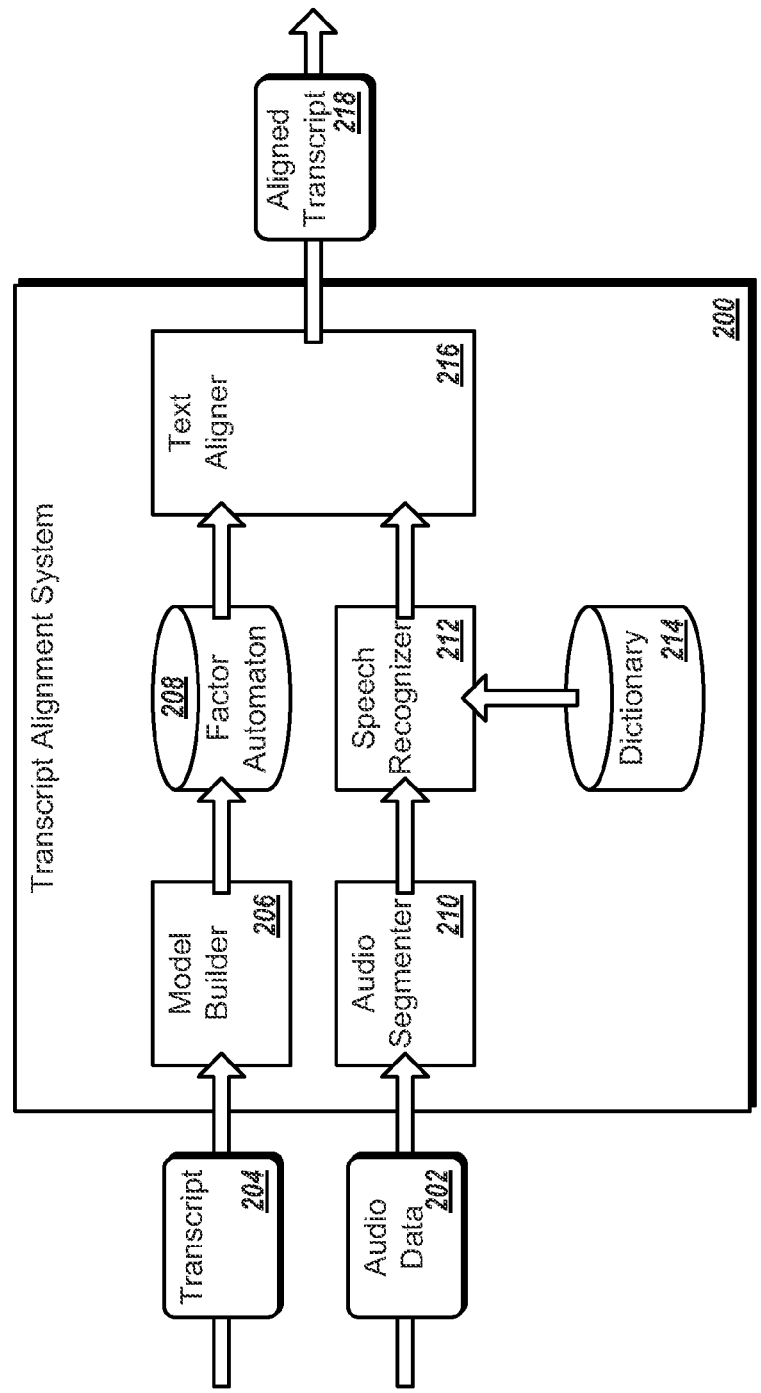
FIG. 2 is a block diagram showing an example of a transcript alignment system.

FIG. 2 is a block diagram showing an example of a transcript alignment system 200. The transcript alignment system 200 receives an utterance such as audio data 202 and a transcript 204 of the audio data 202. A model builder 206 can generate a factor automaton 208 from the text of the transcript 204. In some implementations, the factor automaton 208 can be navigated, or explored, to retrieve all possible substrings of the text in the transcript 204.

The transcript alignment system 200 includes an audio segmenter 210. The audio segmenter 210 segments or divides the audio data 202 into portions of audio that may be easily processed by a speech recognizer 212. For example, the transcript alignment system 200 may have a finite amount of memory available for speech recognition processing. The audio segmenter 210 can break up the audio data 202 into blocks that fit within the space provided by the available amount of memory. In some implementations, the breaks occur at periods of little or no audio, such as a pause in speaking, or at locations where there may be poor recognition, such as audio including noise or music. The audio segmenter 210 can provide the segmented audio data to the speech recognizer 212.

The speech recognizer 212 can analyze the segmented audio data to determine text or words that represent the audio data 202. In some implementations, the speech recognizer 212 comprises a perceptual linear prediction (PLP) features based system. Features may be rotated using linear discriminate analysis (LDA). The statistics of the features can be modeled using, for example, a Gaussian mixture model (GMM) based triphone hidden Markov models (HMMs), decision trees, semi-tied covariance (STC), and a finite state transducer (FST) based search. Transducers may be used to represent the language models, dictionary and triphone to phone mappings. Additionally, the tranducers may be combined in a single static transducer network.

The speech recognizer 212 can use a dictionary 214 to identify candidates for the recognized words. For example, if a particular recognized text is similar to a word in the dictionary 214, the dictionary word can be chosen as the recognized text. In some implementations, additional words can be added to the dictionary 214, such as words that are not found in a typical vocabulary. The speech recognizer 212 can use a pronunciation-by-analogy algorithm to determine if a portion of the audio data 202 can be represented by these out-of-vocabulary words in the dictionary 214. One example of such a pronunciation-by-analogy algorithm is described in "Corpus-based methods and hand-built methods" in the Sixth International Conference on Spoken Language Processing, 2000, by Richard Sproat, the entirety of which is incorporated by reference herein. The speech recognizer 212 may provide the recognized words and the times at which the recognized words occur in the audio data 202 to a text aligner 216.

The text aligner 216 may receive the recognized words and locate the recognized words in the factor automaton 208. For example, the text aligner 216 may start at the first state of the automaton and follow transitions to subsequent states of the automaton. The text aligner 216 can associate the times of the recognized words that were matched to paths in the automaton. The text aligner 216 can output an aligned transcript 218 that includes the transcript text and the associated times at which the words occur in the audio data 202.

In some implementations, various operations performed by the transcript alignment system 200 or modules included in the transcript alignment system 200 can be distributed across multiple systems. For example, a first system can perform the speech recognition, while a second system performs the model generation, and a third system performs the text alignment. In some implementations, portions of a transcript or audio data can be distributed across multiple systems. For example, a transcript can be divided into multiple portions and the model generation operations can be distributed across multiple systems or audio data can be divided into multiple portions and the speech recognition operations can be distributed across multiple systems.

Figures 3A, 3B:
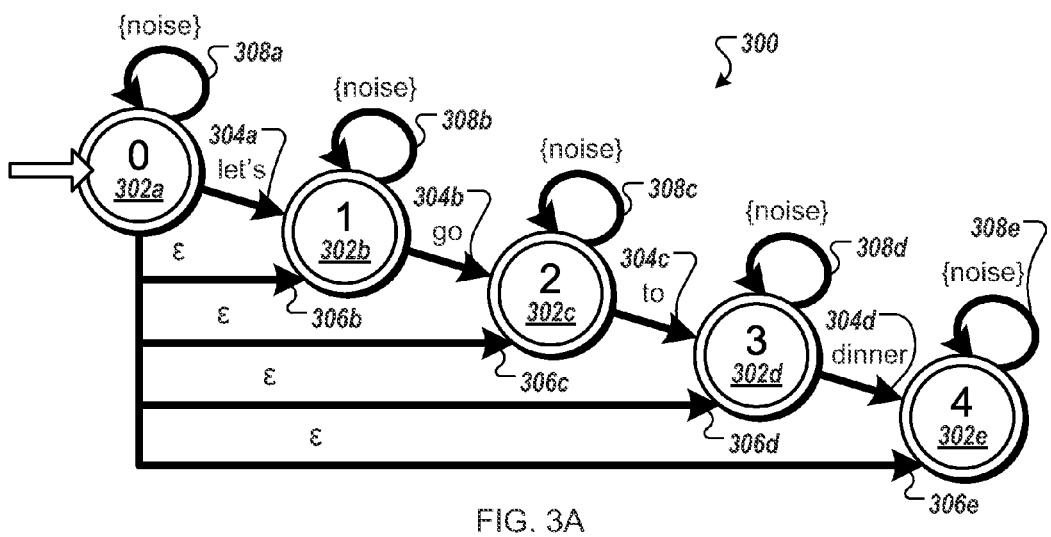
FIGS. 3A-B are representations showing examples of a factor automaton used in aligning a transcript to audio data.

FIG. 3A is an example graphical representation of a factor automaton 300 for use in aligning a transcript to audio data. In one implementation, the factor automaton 300 is a nondeterministic finite automaton representing, for example, all possible substrings of a transcript including the phrase "let's go to dinner." The factor automaton 300 includes multiple automaton states 302a-e representing the five allowed states of the factor automaton 300. The factor automaton 300 includes multiple transitions 304a-d linking the automaton states 302a-e. Each of the transitions 304a-d corresponds to a word in the transcript phrase "let's go to dinner," respectively.

The automaton state 302a is a starting state. Substrings generated from the factor automaton can start at the automaton state 302a. At each automaton state, the substring building process has at least two options including completion of the substring and following the next transition to add another word to the substring.

For example, the transcript represented by the factor automaton 300 may be associated with audio data that has been decoded by a speech recognizer. In this example, the decoded speech may include the words of "let's go have dinner." At the automaton state 302a, taking the transition 304a adds the text "let's" to a substring. The transcript substring is compared to the recognized words. The word "let's" from the transcript matches the first recognized, or decoded, word "let's." Following the transition 304b, the transcript word "go" is added to the substring. Again the substring is compared to the recognized words and the substring continues to match the text in the decoded words (e.g., "let's go"). If the transition 304c is followed, then the substring and the recognized words no longer match (e.g., "let's go to" and "let's go have"). In one implementation, the alignment of the transcript stops at the automaton state 304b and the times from the recognized words "let's go" are associated with the transcript words "let's go."

In one implementation, the alignment of the transcript to the audio data represented by the recognized words may continue at the recognized word where the alignment previously ended. The alignment processing continues by searching for the word "have" in the factor automaton 300. The factor automaton 300 includes multiple epsilon transitions 306b-e. The automaton states 302b-e each have a corresponding epsilon transition 306b-e, respectively. The epsilon transitions 360b-e allow a substring to begin from any of the automaton states 302b-e.

For example, after not finding the recognized word "have" in the factor automaton 300, the alignment process may continue by searching for the next decoded word "dinner" in the factor automaton 300. The recognized word "dinner" is found by following the epsilon transition 306d to the automaton state 302d and then following the transition 304d to the automaton state 302e where the substring ends. The times of the recognized word "dinner" are then associated with the transcript word "dinner" and included in the aligned transcript.

In some implementations, a subsequent comparison of recognized words can continue at the automaton state where a previous comparison process "left off." For example, a first comparison operation may end at the automaton state 302c after processing the recognized words "let's go." A subsequent comparison operation with the remaining recognized words "have dinner" can continue at the automaton state 302c where the first comparison ended. In some implementations, this is in lieu of initiating the subsequent comparison operation from the automaton state 302a at the beginning of the factor automaton 300.

In some implementations, times for words in the transcript having no matching or similar words in the recognized words can be extrapolated. For example, a start time and stop time for the transition 304c representing the transcript word "to" can be estimated using the end time of the transition 304b and the start time of the transition 304d. In some implementations, where multiple transitions exist in a portion of a transcript having no associated recognized words, the times can be distributed among the transitions. For example, the distributed time can be based on the number of syllables in the words for each transition or can be retrieved from a database of typical transition times for the particular word.

The factor automaton 300 may also include multiple self loop transitions 308a-e. For example, the automaton states 302a-e each have a self loop transition 308a-e, respectively. In some implementations, the self loop transitions 308a-e allow the factor automaton 300 to model noise, silence, or other unrecognized audio in the audio data. In this way, unrecognized audio between any recognized words can be represented by a self loop transition and the matching between the recognized words and the automaton paths between states 302a-e can continue. For example, if unrecognized audio or a recognized word with a low level of confidence occurs between the recognized words "let's" and "go," then this noise can be represented by the self loop transition 308b at the automaton state 302b.

In another example, the self loop transitions 308a-e can be used to model recognized words that do not occur in the transcript. For example, the recognized words may include "let's go to the dinner." In this example, the recognized word "the" does not exist at the prescribed location in the factor automaton 300. The recognized word "the" can be represented using the self loop transition 308de at the automaton state 302d.

In some implementations, the factor automaton can be mathematically expressed in the following way. Let $\Delta^* = \{word_1, word_2, \ldots, word_m\}$ denote the set of words in the transcript, and let x be the string of words representing the transcript to which the audio is aligned. A factor or substring of x, an element of $\Delta^*$, is a sequence of consecutive words appearing in x. Thus, y is a factor of x if and only if there exists u and v, also elements of $\Delta^*$ such that x equals uyv. The set of factors of x is denoted by Fact(x). Any substring of x is thus an element of Fact(x). If x is a string of N words, then Fact(x) contains N+1 states and 2N−1 transitions.

FIG. 3B is an example tabular representation of a factor automaton 310 for use in aligning a transcript to audio data. The factor automaton 310 includes multiple transitions 312 representing the accepted transitions among states of the factor automaton 310. The transitions 312 correspond to the automaton states 302a-e in the graphical representation of the factor automaton 300. And they indicate that these states can be final. The factor automaton 310 includes multiple transitions 314 representing the words associated with transitions to subsequent states of the factor automaton 310. The transitions 314 correspond to the transitions 304a-d in the graphical representation of the factor automaton 300. The factor automaton 310 includes multiple transitions 316 representing the epsilon transitions associated with the automaton states in the factor automaton 310. The transitions 316 correspond to the epsilon transitions 306b-e in the graphical representation of the factor automaton 300. The factor automaton 310 includes multiple transitions 318 representing the self loop transitions associated with the automaton states in the factor automaton 310. The transitions 318 correspond to the self loop transitions 308a-e in the graphical representation of the factor automaton 300.

A factor automaton can be represented in multiple manners including both the graphical form of the factor automaton 300 and the tabular form of the factor automaton 310. In some implementations, a model builder can generate the tabular form of the factor automaton (e.g., in a flat text file using column delimiters) and then the factor automaton can be compiled into a binary format for use by a transcript aligner.

Figure 4:
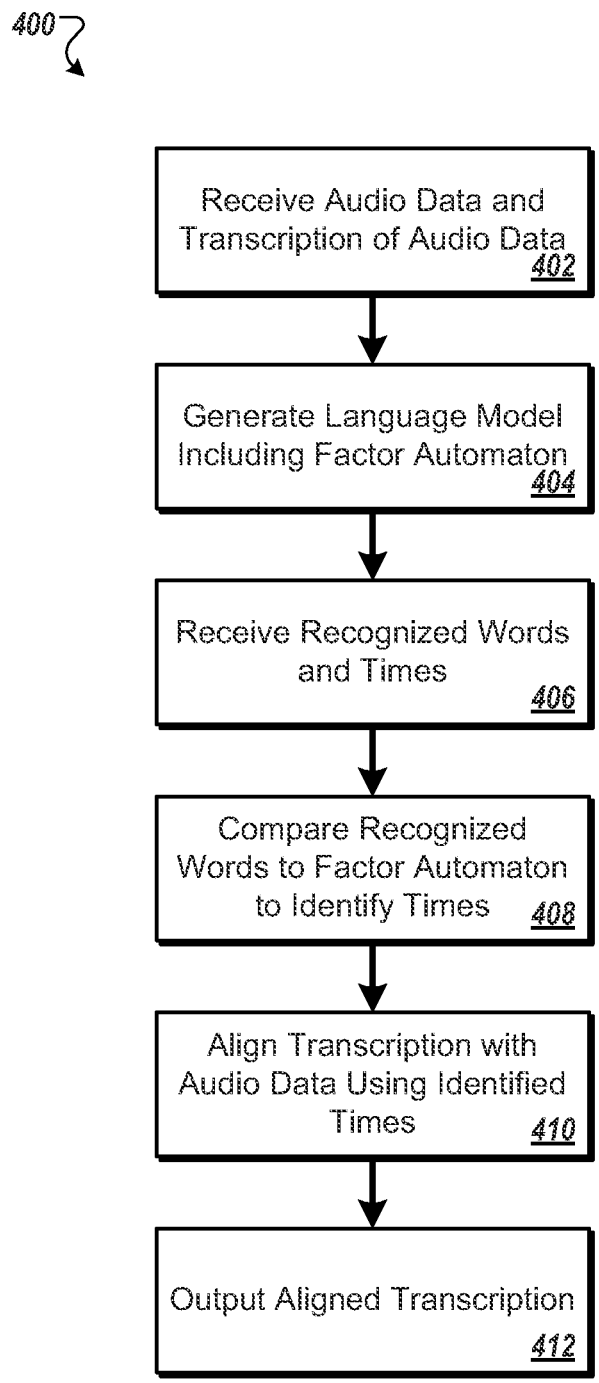
FIG. 4 is a flow chart showing an example of a process for aligning a transcript to audio data.

FIG. 4 is a flow chart showing an example of a process 400 for aligning a transcript to audio data. The process 400 may be performed, for example, by a system such as the system 100 and the transcript alignment system 200. For clarity of presentation, the description that follows uses these systems as the basis of an example for describing the process 400. However, another system, or combination of systems, may be used to perform the process 400.

The process 400 begins with receiving (402) audio data and a transcript of the audio data. For example, the transcript alignment system 102 can receive a television news broadcast and closed-captioning for the broadcast.

The process 400 can generate (404) a language model from the transcript. The language model includes a factor automaton. The factor automaton can include automaton arcs, each of which may correspond to a word from the transcript. For example, the model builder 206 can generate a language model such as the factor automaton 300. The factor automaton 300 includes the automaton states 302a-e with arcs corresponding to the words "let's go to dinner." In general, a model builder can generate a factor automaton much larger than the single sentence in this example. For example, an audio data and corresponding transcript may represent an entire television program, movie, theatrical product, radio program, or audio book. In some implementations, the factor automaton 300 in graphical form can be represented by the factor automaton 310 in tabular form. In some implementations, the model builder 206 generates a factor automaton in tabular form and the tabular factor automaton is compiled into a binary or other computer-readable format for fast access.

The process 400 receives (406) recognized words and times at which each of the recognized words occur in the audio data. The recognized words and times at which each of the recognized words occur in the audio data are determined from the received audio data. A speech recognizer provides the recognized words and times to the process 400. For example, the speech recognizer 212 can process the audio data 202 to determine recognized words in the audio data 202. The speech recognizer 212 provides the recognized words and the times at which the recognized words occur in the audio data 202 to the text aligner 216. The speech recognizer 212 may be part of the transcript alignment system 200 or separate from the transcript alignment system 200.

The process 400 can compare (408) the recognized words to one or more of the words from the factor automaton to identify times at which the one or more of the words from the transcript occur in the audio data. For example, the text aligner 216 compares the recognized words to automaton arcs connecting states in the factor automaton 208. For the recognized words having similarities or that match the automaton arcs connecting states, the text aligner 216 can identify the times at which those recognized words occur and can associate the identified times with the corresponding words from the automaton arcs.

The process 400 can align (410) a portion of the transcript with a portion of the audio data using the identified times. For example, the text aligner 216 associates the identified times for decoded words with the corresponding words in the transcript 204. In some implementations, the text aligner 216 may estimate times for words in the transcript 204 that have no corresponding recognized words and times. In some implementations, the text aligner 216 may send portions of the audio data 202 back to the speech recognizer 212 to be processed again. For example, if recognized words from a block of audio data have no corresponding words from the transcript, the block of audio data may be sent back to the speech recognizer 212 to be processed again (e.g., iterating steps 402-410).

In some implementations, a block of audio data may be sent back to the speech recognizer 212 and/or the text aligner 216 if a degree in which the transcript 204 matches the recognized words from the audio data 202 does not meet a threshold level. For example, the speech recognizer 212 may provide confidence levels indicating an amount of confidence in the accuracy of an alignment of one or more words. If a confidence level is below a threshold level of confidence, then the steps 402-410 can be performed again.

The process 400 can output (412) the aligned portion of the transcript. For example, the text aligner 216 can output the aligned transcript 208 and the corresponding audio for integration into a corpus of audio and text used to train speech recognizers, such as the speech recognizer 214.

Figure 5:
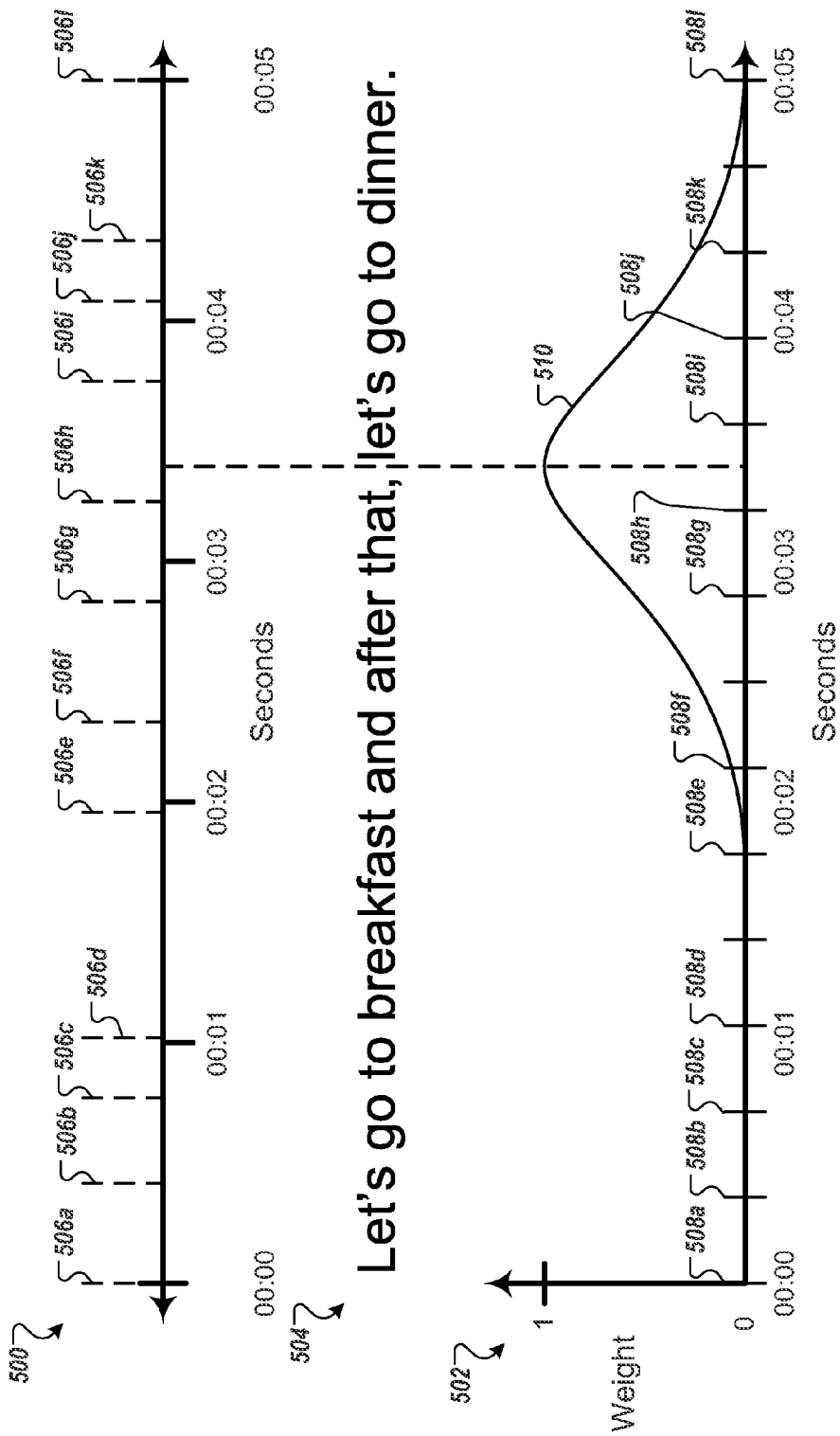
FIG. 5 includes graphs showing an example of weighting an alignment of a transcript to audio data.

FIG. 5 includes an example of a timeline 500 of recognized words and a graph 502 showing an example of weighting an alignment of a transcript 504 to audio data. The graph 502 includes estimates of the times that words in the transcript may occur in the audio data. The graph 502 is also used to weight the likelihood of a particular occurrence of a word in the transcript corresponding to a particular match in the recognized words. In the example shown here, the transcript includes two occurrences of the word "let's." This weighting may help prevent an occurrence of "let's" in the transcript from being incorrectly matched to an occurrence of "let's" in the recognized words (e.g., to prevent the second instance of "let's" in the transcript from being matched to a first instance of "let's" in the recognized words that occurs at a different time).

The timeline 500 includes a number of times 506a-l ranging from zero seconds to five seconds representing the start and end times of the recognized words. For example, the time 506a is the start of the first recognized word. The time 506b is the end of the first recognized word and the start of the second recognized word. While the recognized words are shown here as sharing start and end times, pauses or other breaks between words can be represented separate from the recognized words.

The transcript 504 includes the text "Let's go to breakfast and after that, let's go to dinner." In this weighting example, a number of time estimates 508a-l are made for each syllable of the transcript 504. The time estimates 508a-l may be divided evenly across the five seconds of the total audio length. In another example, the time estimates 508a-l can be based on other factors, such as the number of letters in a word, phones within the words, or a database of expected time durations for each word. In some implementations, the estimated word durations are normalized to the total length of the audio data.

The graph 502 includes a weighting curve 510 for the second occurrence of the word "let's" in the transcript 504. The weighting curve 510 indicates that this instance of the word "let's" has a high probability of occurring at a location between three and four seconds. In one example, a particular comparison operation may begin with a comparison of this second instance of the word "let's" in the transcript to the first recognized word "Let's." The first recognized word occurs between zero second and one second at the times 506a-b. While the first recognized word does match the transcript word, the first recognized word has a very low probability of representing the second occurrence of the word "let's" in the transcript 504 due to the weighting curve 510 having a value at or near zero between the times 506a-b.

The eighth recognized word also matches the transcript word "let's." The eighth recognized word occurs between three seconds and four seconds at the times 506h-l. The eighth recognized word has a high probability of representing the second occurrence of the word "let's" in the transcript 504 due to the weighting curve 510 having a value at or near one between three and four seconds.

In some implementations, the weight may be combined with other factors, such as a confidence value for the recognized words. The speech recognizer may generate confidence values in the recognized words determined from the audio data. The confidence values may indicate how confident the speech recognizer is that a particular recognized word actually represents the associated audio data. In some implementations, the weighting and/or confidence can be compared to a threshold value to determine if a recognized word matches an automaton arc.

In some implementations, the shape of the weighting curve 508 may be different than the shape shown here. For example, for a long transcript, such as a movie or book, a weighting curve may stretch over multiple sentences. Alternatively, a weighting curve may have narrower width to allow targeting a specific syllable or phone within a word. In some implementations, the width of the weighting curve 510 is determined by an expected accuracy of the time estimates 508a-l.

Figure 6:
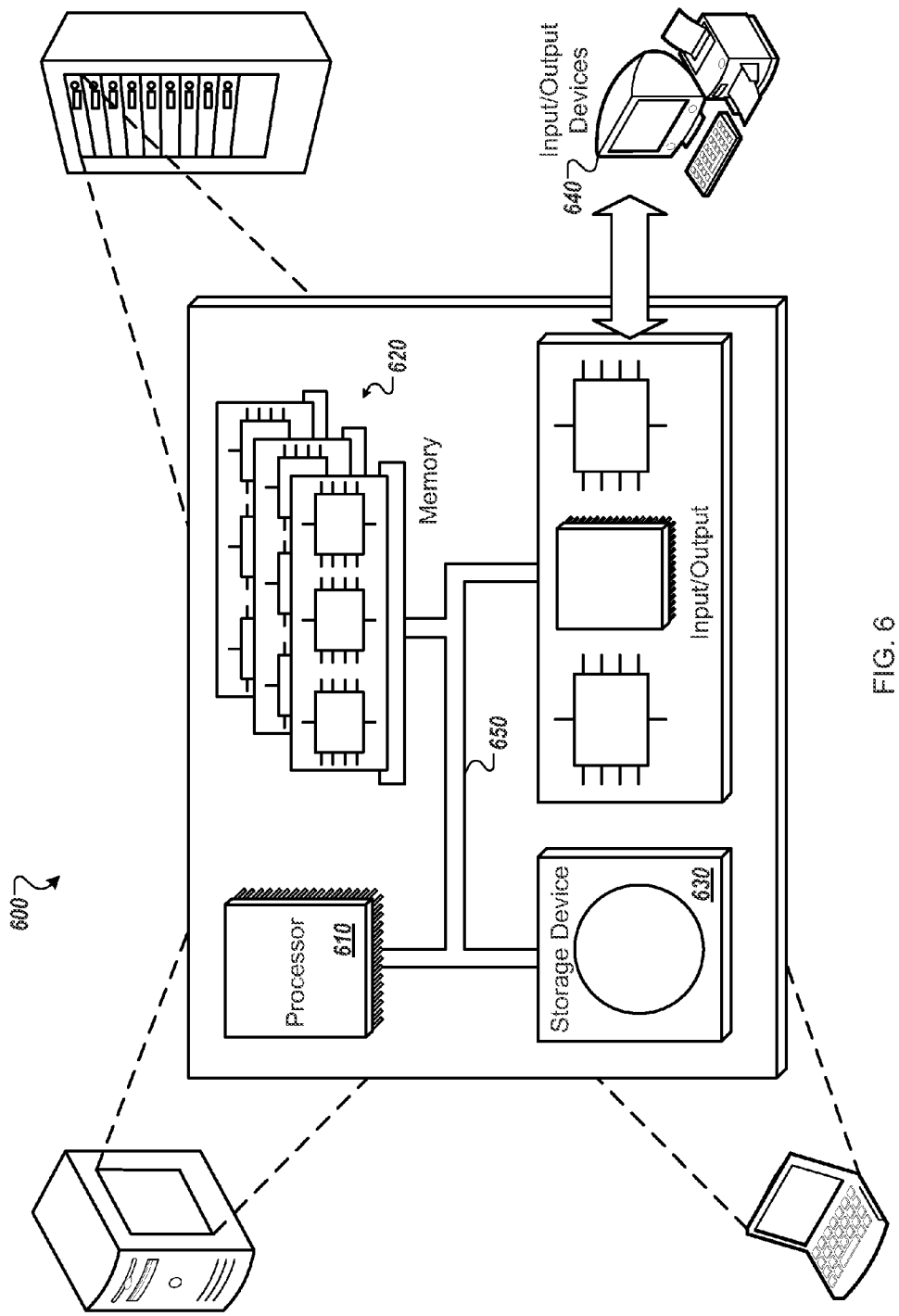
FIG. 6 is a schematic diagram showing an example of a computing system that can be used in connection with computer-implemented methods described in this document.

FIG. 6 is a schematic diagram of a computing system 600. The generic computing system 600 can be used for the operations described in association with any of the computer-implement methods or systems described previously, according to one implementation. The generic computing system 600 includes a processor 610, a memory 620, a storage device 630, and an input/output device 640. Each of the processor 610, the memory 620, the storage device 630, and the input/output device 640 are interconnected using a system bus 650. The processor 610 is capable of processing instructions for execution within the generic computing system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the generic computing system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the generic computing system 600. In one implementation, the storage device 630 is a computer-readable medium. In various different implementations, the storage device 630 may be a floppy disk device, a hard disk device, an optical disk device, or a tape device.

The input/output device 640 provides input/output operations for the generic computing system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method, comprising:
   receiving audio data and a textual transcript of the audio data to be aligned with the audio data;
   generating, from the textual transcript, a language model that represents a set of particular substrings of the textual transcript, the language model comprising allowed states of the language model and one or more transitions that link the allowed states;

receiving, from a speech recognizer, recognized language elements from the received audio data and times at which the recognized language elements occur in the audio data;

comparing the recognized language elements from the audio data to substrings represented by the language model to identify times at which particular ones of the substrings occur in the audio data;

aligning a portion of the textual transcript with a portion of the audio data using the identified times; and outputting the aligned portion of the textual transcript.

2. The method of claim 1, wherein the set of substrings in the textual transcript and the recognized language elements comprise words, syllables, phonemes, or phones.

3. The method of claim 1, wherein comparing comprises transitioning to a subsequent substring when a recognized language element is successfully matched with a substring.

4. The method of claim 1, wherein comparing the recognized language elements to the substrings further comprises searching the substrings for a substring that substantially matches a recognized language element.

5. The method of claim 4, wherein searching further comprises ending the comparison or continuing to a next substring adjacent to a previous substring, wherein the previous substring comprises a language element from the textual transcript that was last successfully matched to a recognized language element.

6. The method of claim 1, further comprising estimating times at which the substrings likely occur in the audio data, and weighting the comparison of the recognized language elements and the substrings based on a difference between the estimated times and the times associated with the recognized language elements from the audio data.

7. The method of claim 1, further comprising determining a level of confidence for the alignment of the substrings with the recognized language elements from the audio.

8. The method of claim 7, further comprising selecting audio data and substrings associated with the level of confidence when the level does not meet a threshold level of confidence.

9. The method of claim 8, further comprising iteratively performing the method of claim 8 on the selected audio data and transcript portions until the threshold level is met for the selected audio data and the substrings or until a stop condition occurs.

10. The method of claim 9, wherein the stop condition comprises a number of iterations, an indication that the confidence level is within a satisfactory range from the threshold level, an elapsed period of time, or an amount of processing power used.

11. The method of claim 1, wherein steps of claim 1 are distributed across multiple systems.

12. The method of claim 1, further comprising outputting the received audio with the output aligned portion of the textual transcript.

13. The method of claim 12, further comprising storing the output audio and the aligned portion of the textual transcript in a training corpus configured for use in training speech recognition systems.

14. The method of claim 1, wherein the received audio data is based on television broadcasts, online videos, audio books, or music.

15. The method of claim 1, wherein the received textual transcript is based on closed captions, lyrics, or books.

16. The method of claim 1, wherein the transitions include at least one of self loops and epsilon transitions.

17. A computer-implemented method comprising:
receiving audio data and a textual transcript of the audio data to be aligned with the audio data;

generating, from the textual transcript, a language model that represents a set of particular substrings of the textual transcript, the language model comprising allowed states of the language model and one or more transitions that link the allowed states;

generating a speech hypothesis of one or more language elements included in the audio using a speech recognizer, wherein the speech hypothesis includes time stamps associated with an occurrence of each of the one or more language elements;

comparing the one or more language elements of the speech hypothesis to the substrings generated by the language model the language model to identify times at which particular ones of the substrings occur in the audio data; and associating at least a portion of the textual transcript with the time stamps based on the comparison.

18. The method of claim 17, further comprising outputting the received audio with the associated portion of the textual transcript.

19. The method of claim 17, wherein the received audio data is based on television broadcasts, online videos, audio books, or music.

20. The method of claim 17, wherein the received textual transcript is based on closed captions, lyrics, or books.

21. The method of claim 17, wherein the substrings from the set of substrings in the textual transcript and the recognized language elements comprise words, syllables, phonemes, or phones.

22. The method of claim 17, wherein comparing comprises transitioning to a subsequent substring when a language element from the speech hypothesis is successfully matched with a substring.

23. The method of claim 17, wherein comparing further comprises searching the substrings for a substring that substantially matches a language element from the speech hypothesis.

24. A computer-implemented system, comprising:
one or more computers having
an interface that receives audio data and a textual transcript of the audio data to be aligned with the audio data;
a model builder module that generates, from the textual transcript, a language model that represents a set of particular substrings of the textual transcript, the language model comprising allowed states of the language model and one or more transitions that link the allowed states;
a storage device that stores the set of substrings of the textual transcript;
a speech recognizer that recognizes language elements from the received audio data and determines times at which particular ones of the recognized language elements occur in the audio data; and
means for comparing the recognized language elements to substrings to identify times at which particular ones of the substrings occur in the audio data and aligning a portion of the textual transcript with a portion of the audio data using the identified times, and outputting the aligned portion of the textual transcript.

* * * * *